Dec. 30, 1924.
E. E. CARRINGTON
1,521,504
CARRIER ATTACHMENT TO CYCLE FRAMES
Filed April 16, 1923
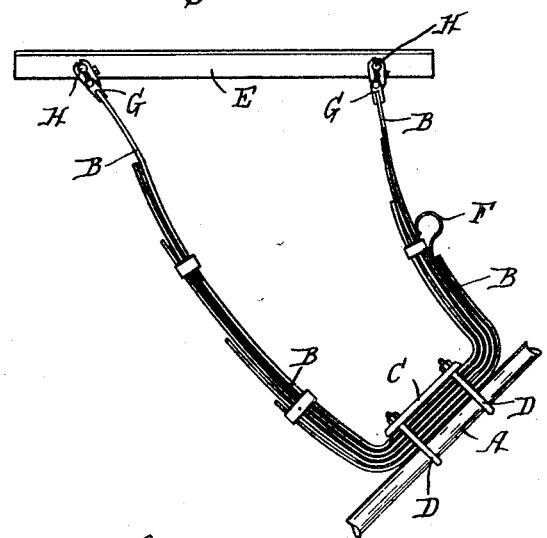
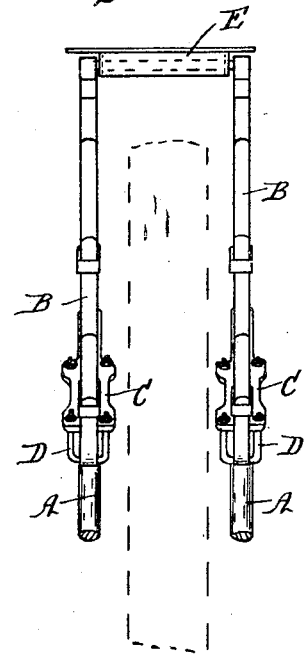
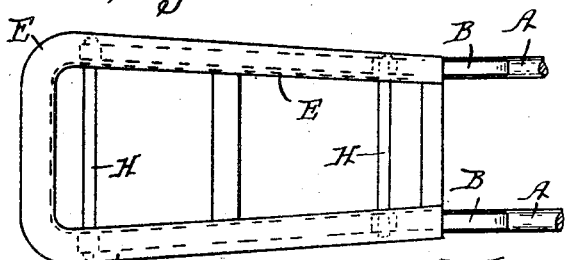
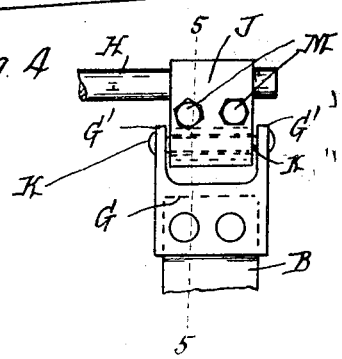
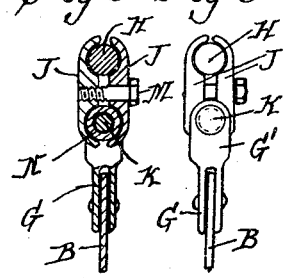
Inventor:
Ernest Edward Carrington
By
Attorney.

Patented Dec. 30, 1924.

1,521,504

UNITED STATES PATENT OFFICE.

ERNEST EDWARD CARRINGTON, OF NAPIER, NEW ZEALAND.

CARRIER ATTACHMENT TO CYCLE FRAMES.

Application filed April 16, 1923. Serial No. 632,492.

*To all whom it may concern:*

Be it known that I, ERNEST EDWARD CARRINGTON, subject of the King of Great Britain, residing at 72 Georges Drive, Napier, Dominion of New Zealand, have invented a new and useful Improved Carrier Attachment to Cycle Frames, of which the following is a specification.

This invention has been devised in order to provide an improved form of rear carrier for cycle frames, especially adapted for carrying a pillion seat, but useful also for other analogous purposes.

The attachment is designed to be supported wholly by the rear wheel fork stay and to provide a springy yielding seat, or carrier base, positioned above the top of such rear wheel.

In carrying out the invention, each member of the frame fork has a spring formed by any approved number of flat leaves, bent into U shape, fastened to it so that the two ends extend upwards approximately at right angles to the incline of such fork member. The two ends of this spring, however, are made of such lengths that they occupy a plane parallel with the ground. The springs on the two members of the frame fork are positioned at the same level. The platform of the carrier, or the pillion seat, is then placed over the four spring ends thus provided, and attached thereto by link attachments of suitable design so that it will be kept level and be cushioned by the springs extending at an inward angle between it and the frame.

The accompanying drawings illustrate the manner of constructing the attachment. In the drawings:—

Figure 1 is a side elevation,

Figure 2 a back end elevation, and

Figure 3 a plan of the attachment shown fastened to the fork of the cycle.

Figure 4 is a rear elevation, in enlarged detail, showing means for fastening the spring ends to the carrier frame.

Figure 5 is a sectional view on line 5—5 of Fig. 4, and

Figure 6 a side elevation thereof.

The reference characters A—A represent the ordinary rear wheel fork stay members of a cycle frame to which the attachment is fastened. This attachment is made up of two U-shaped springs B and a flat frame E. Each of the springs is formed by a number of ordinary spring strips or leaves laid one within the other and with their ends bent up into the U form. These ends are made of varying lengths on the well known principle in spring construction and the leaves are banded together in the usual manner. Each spring thus constructed is disposed so that its bottom portion extends along the top of one of the inclined members A of the fork and is clamped thereon by means of a clamping plate C overlying it and the clamping bolts D. Its two ends then project upwardly and at a rearward incline. The two springs are disposed upon their respective fork members in corresponding positions and their upper ends are carried upward to the same horizontal plane. Combined with the springs is the flat metal frame E to which the several ends of the springs are articulated, so that the frame is supported horizontally upon the springs and, by reason of the upward and rearward inclination of their ends, upon the full cushioning action of the springs.

The leaves of the spring are preferably disposed in the manner shown in the drawings so that the end on the rear side shall have its inside leaf extending to the top, the other leaves then staying it by being stepped in their length. Also so that the end on the front side shall have one of its outer leaves carried to the top while the inner leaves are stepped to stay it on the rear, its next outer leaf is bent round into a curve, as at F, to act as a cushion on the rebound.

The frame E serves as the carrier base, or as the seat base when the attachment is used as a pillion seat, and may therefore rise and fall on its four spring supports, independently of the cycle frame. Consequently, an effective spring cushioning of the carrier is obtained.

The spring ends are attached to the frame E in any approved manner such as to provide for the necessary swivelling or articulation in the up and down movements of the frame. In the drawings, Figures 4–6, a suitable manner of obtaining this attachment is shown. This consists in securing the spring leaf end within a clamp G constructed with a bearing lug G' at each end, and in providing the frame E with a transversely extending rod H to the end of which an ear J comprising a pair of cooperating ears is clamped, which ear also passes in between the lugs G' and then is journalled therein by means of a rivet pin K passing through both lugs and the ear. The said ear is made in two parts adapted to engage the rod H on its respective sides and also to encircle the rivet pin from the respective sides and to be fastened together by set screws M. A wearing bush N is however provided to be held within the ear and to surround the pin K so that the pin will rotate within this bush as the spring end moves up and down in correspondence with cushioning action of the attachment.

I claim:—

1. A carrier attachment for cycle frames comprising a pair of U-shaped spring members adapted to be mounted on the cycle frame; a clamp on each end of the spring members; a pair of cooperating ears pivotally mounted in each of said clamps; a rod in each pair of opposite cooperating ears; a frame mounted on said rods; and securing means for securing each of said cooperating ears to said rod and to its pivotal mounting.

2. A carrier attachment for cycle frames comprising a pair of U-shaped spring members; a frame secured to the ends of said spring members; and a cushioning member comprising a circular bent portion at the end of one of the leaves of said spring members and adapted to press against other spring members.

3. A carrier attachment for cycle frames comprising a pair of U-shaped spring members; fastening means for securing said springs to said cycle frame by means of the bottom of the U of said spring members; a clamp on the ends of each spring member; a pair of cooperating ears pivotally mounted in each of said clamps; a rod secured in each pair of cooperating ears; and a frame mounted on said rods and adapted to assume a horizontal position.

4. A carrier attachment for cycle frames comprising a pair of U-shaped springs adapted to be mounted on the cycle frame so that the ends extend upwardly; a clamp secured to each end of said U-shaped spring; a pair of ears pivotally mounted in said clamp; and a frame secured to said ears by means of rods and adapted to assume a horizontal position.

5. A carrier attachment for cycle frames comprising a pair of U-shaped spring members, said springs being composed of leaves of varying lengths; fastening means for said spring members; a frame pivotally secured to the ends of said springs; and a cushioning member comprising one of the leaves of said springs on a corresponding arm of each of said spring members.

6. A carrier attachment for cycle frames comprising a pair of U-shaped spring members adapted to be mounted on the cycle frame; a clamp on each end of the spring members; a pair of cooperating ears pivotally mounted in each of said clamps; a rod in each pair of opposite cooperating ears; and securing means for securing each of said cooperating ears to said rod and to its pivotal mounting.

In testimony whereof, I affix my signature.

ERNEST EDWARD CARRINGTON.